(12) United States Patent
Hiraiwa et al.

(10) Patent No.: US 10,573,904 B2
(45) Date of Patent: Feb. 25, 2020

(54) FUEL CELL

(71) Applicant: SUMITOMO ELECTRIC INDUSTRIES, LTD., Osaka-shi, Osaka (JP)

(72) Inventors: Chihiro Hiraiwa, Itami (JP); Masatoshi Majima, Itami (JP); Hiromasa Tawarayama, Itami (JP); Naho Mizuhara, Itami (JP); Takahiro Higashino, Itami (JP); Yohei Noda, Itami (JP); Kazunari Miyamoto, Itami (JP); Toshihiro Yoshida, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 140 days.

(21) Appl. No.: 15/743,823

(22) PCT Filed: Jul. 8, 2016

(86) PCT No.: PCT/JP2016/070327
§ 371 (c)(1),
(2) Date: Jan. 11, 2018

(87) PCT Pub. No.: WO2017/010436
PCT Pub. Date: Jan. 19, 2017

(65) Prior Publication Data
US 2018/0205095 A1 Jul. 19, 2018

(30) Foreign Application Priority Data

Jul. 16, 2015 (JP) .................................. 2015-142288
Jan. 29, 2016 (JP) .................................. 2016-016685

(51) Int. Cl.
| | | |
|---|---|---|
| H01M 8/02 | (2016.01) |
| H01M 8/12 | (2016.01) |
| H01M 8/0232 | (2016.01) |
| C25B 11/03 | (2006.01) |
| C25B 1/10 | (2006.01) |
| C25B 9/20 | (2006.01) |
| H01M 8/0245 | (2016.01) |

(Continued)

(52) U.S. Cl.
CPC ............. *H01M 8/0232* (2013.01); *C25B 1/10* (2013.01); *C25B 9/20* (2013.01); *C25B 11/035* (2013.01);
(Continued)

(58) Field of Classification Search
CPC ............ H01M 8/02; H01M 8/04; H01M 8/12; H01M 8/0232; H01M 8/1213
See application file for complete search history.

(56) References Cited

U.S. PATENT DOCUMENTS

| 4,086,155 A | 4/1978 | Jonville | |
|---|---|---|---|
| 2004/0101742 A1* | 5/2004 | Simpkins | ............ H01M 8/0232 429/468 |

(Continued)

FOREIGN PATENT DOCUMENTS

| DE | 19647534 A1 | 5/1998 |
|---|---|---|
| EP | 1353391 A1 | 10/2003 |

(Continued)

OTHER PUBLICATIONS

Machine Translation of: JP 2003-100323 A, Koji et al., Apr. 4, 2003.*

*Primary Examiner* — Kenneth J Douyette
(74) *Attorney, Agent, or Firm* — Drinker Biddle & Reath LLP

(57) ABSTRACT

A fuel cell includes a MEA that includes a cathode, an anode, and a solid electrolyte layer disposed between the cathode and the anode, the solid electrolyte layer containing an ion-conducting solid oxide; at least one first porous metal body adjacent to at least one of the cathode and the anode and having a three-dimensional mesh-like skeleton; a second porous metal body stacked to be adjacent to the first porous metal body and having a three-dimensional mesh-like skeleton; and an interconnector adjacent to the second porous
(Continued)

metal body. The first porous metal body has a pore size smaller than a pore size of the second porous metal body.

8 Claims, 4 Drawing Sheets

(51) Int. Cl.
  *H01M 8/0247* (2016.01)
  *H01M 8/1246* (2016.01)
  *H01M 8/124* (2016.01)

(52) U.S. Cl.
  CPC ....... *H01M 8/0245* (2013.01); *H01M 8/0247* (2013.01); *H01M 8/1246* (2013.01); *H01M 2008/1293* (2013.01)

(56) References Cited

U.S. PATENT DOCUMENTS

| 2004/0234836 | A1 | 11/2004 | Orishima et al. |
| 2010/0233577 | A1* | 9/2010 | Carpenter .............. B82Y 30/00 |
| | | | 429/492 |
| 2011/0287340 | A1 | 11/2011 | Mougin et al. |

FOREIGN PATENT DOCUMENTS

| JP | 2003-100323 A | 4/2003 |
| JP | 2007-250297 A | 9/2007 |
| WO | WO-03/012903 A1 | 2/2003 |
| WO | WO 2013/143833 A1 | 10/2013 |
| WO | WO-2014/082170 A1 | 6/2014 |

* cited by examiner

FUEL CELL

TECHNICAL FIELD

The present invention relates to a fuel cell. This application claims priority to Japanese Patent Application No. 2015-142288 filed Jul. 16, 2015, and Japanese Patent Application No. 2016-016685 filed Jan. 29, 2016, and the entire contents of the Japanese applications are hereby incorporated by reference.

BACKGROUND ART

A fuel cell is a device that generates electrical power by the electrochemical reaction of fuel gas, such as hydrogen, and air (oxygen), and has high power generation efficiency because of the capacity to directly convert chemical energy to electricity. In particular, a solid oxide fuel cell (hereinafter referred to as SOFC) having an operation temperature of 1000° C. or lower has bright prospects due to its high reaction rate. In a SOFC, a membrane electrode assembly (MEA) in which an electrolyte layer containing a solid oxide and two electrodes formed of ceramic (sintered bodies) sandwiching the electrolyte layer are integrated is used. In other words, handling is easy since all of the constitutional elements of the MEA are solid.

Typically, in order to obtain high power, multiple MEAs are stacked and arranged. An interconnector (separator) that separates fuel gas and air from each other is disposed between the MEAs. The interconnector also has a current collecting function for extracting the generated power to the exterior.

A fuel cell needs gas channels adjacent to the MEAs in order to supply fuel gas or air to the MEAs. In order to obtain gas channels, for example, in PTL 1, an expand metal is disposed between a MEA and an interconnector. PTL 2 teaches a method for forming dimples, which serve as gas channels, in the interconnector by etching or the like.

CITATION LIST

Patent Literature

[PTL 1] Japanese Unexamined Patent Application Publication No. 2007-250297

[PTL 2] International Publication No. 2003/12903 pamphlet

SUMMARY OF INVENTION

An aspect of the present invention relates to a fuel cell including a MEA that includes a cathode, an anode, and a solid electrolyte layer disposed between the cathode and the anode, the solid electrolyte layer containing an ion-conducting solid oxide; at least one first porous metal body adjacent to at least one of the cathode and the anode and having a three-dimensional mesh-like skeleton; a second porous metal body stacked to be adjacent to the first porous metal body and having a three-dimensional mesh-like skeleton; and an interconnector adjacent to the second porous metal body. The first porous metal body has a pore size smaller than a pore size of the second porous metal body.

DESCRIPTION OF EMBODIMENTS

Figure 1:
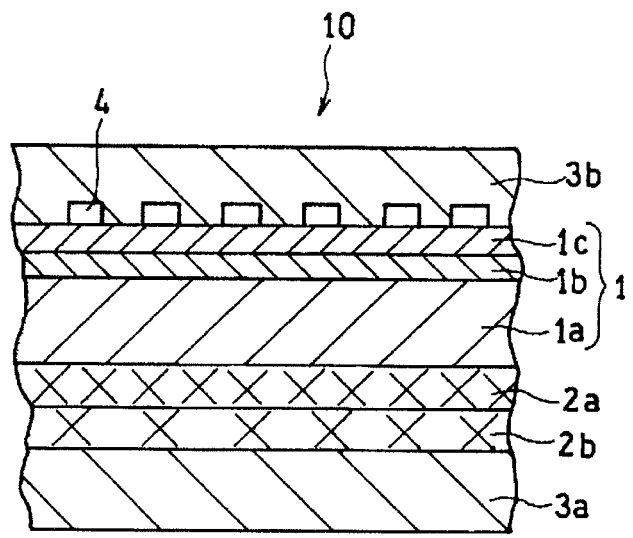
FIG. 1 is a schematic cross-sectional view of a fuel cell according to one embodiment of the present invention.

[Problem to be Solved by Present Disclosure]

Electrons flowing in the MEA are collected via the metal material in contact with the anode and/or the cathode. When the amount of the metal material contacting the anode and/or the cathode is small, electrons do not smoothly flow, and the resistance is increased. In the method described in PTL 1, the expand metal disposed to secure gas channels also serves as a current collector. However, since the expand metal has a large cell size, the resistance tends to be high. However, the expand metal having a large cell size offers high performance as gas channels. In other words, the current collecting property and the gas diffusing property are in a trade-off relationship.

In view of the above, one possible approach is to separately provide a material mainly responsible for the current collecting property and a material mainly responsible for the gas diffusing property. For example, the metal material mainly responsible for the current collecting property (current collector) is disposed between the MEA and the interconnector, and, as described in PTL 2, gas channels are formed by forming dimples in the interconnector. From the viewpoints of the heat resistance, electrical conductivity, and an appropriate gas diffusing property (air-permeability), for example, a nickel sintered body is used as the current collector.

In order to decrease the resistance, it is also important to enhance the contacting property between the current collector and the electrodes (anode and/or cathode). When a nickel sintered body is used as a current collector, fine irregularities are formed on the surface of the current collector. Meanwhile, in a SOFC, the electrodes are also formed of sintered bodies, and the irregularities are formed on the surfaces thereof. It is difficult to enhance the contacting property between sintered bodies that have irregularities and rarely undergo plastic deformation. If pressure is applied to enhance the contacting property, electrodes may become damaged.

The interconnector is required to have excellent heat resistance. Thus, typically, stainless steel having a high chromium content (chromium-based alloy) is used as the material for the interconnector. The chromium-based alloy is hard, and its workability is easily degraded. Thus, in order to form gas channels by forming dimples on the interconnector, special equipment and conditions are required, and this raises cost and decreases production efficiency. A fuel cell is usually configured by stacking multiple (for example, 50 or more) constitutional units each including a MEA and an interconnector. Thus, the increase in process cost per sheet of the inter connector significantly increases the cost for the fuel cell.

Advantageous Effect of Present Disclosure

According to the present invention, a fuel cell (SOFC) that has excellent gas diffusing performance and current collecting performance is obtained.

[Description of the Embodiments of the Present Invention]

First, the contents of the embodiments of the present invention are listed.

(1) A fuel cell according to the present invention includes a MEA that includes a cathode, an anode, and a solid electrolyte layer disposed between the cathode and the anode, the solid electrolyte layer containing an ion-conducting solid oxide; at least one first porous metal body adjacent to at least one of the cathode and the anode and having a three-dimensional mesh-like skeleton; a second porous metal body stacked to be adjacent to the first porous metal body and having a three-dimensional mesh-like skeleton; and an interconnector adjacent to the second porous metal body. The first porous metal body has a pore size smaller than a pore size of the second porous metal body. In this manner, the gas diffusing performance and the current collecting performance of the fuel cell are improved.

(2) Preferably, the first porous metal body and the second porous metal body are bonded, and, in the bonded portion, the skeleton of the first porous metal body and the skeleton of the second porous metal body are entangled. This is because the gas diffusing property and the current collecting performance are further improved. Moreover, improvement in productivity can also be expected.

(3) The first porous metal body and the second porous metal body preferably both have a porosity of 85 vol % or more. This is because the gas diffusing property is further improved.

(4) The first porous metal body preferably has a pore size of 100 to 1000 μm. This is because the current collecting performance is further improved.

(5) The fuel cell according the present invention preferably includes the first porous metal body adjacent to at least the anode. This is because further improvements in power generation efficiency can be expected.

(6) A ratio of the pore size of the first porous metal body to the pore size of the second porous metal body (pore size of first porous metal body/pore size of second porous metal body) is preferably 0.05 to 0.8. This is because the balance between electrical resistance and gas diffusion is particularly excellent in this range.

(7) The second porous metal body preferably has a specific surface area of 100 to 9000 $m^2/m^3$.

(8) The second porous metal body preferably has a thickness of 0.1 to 0.5 mm. This is because the balance between electrical resistance and the gas diffusing property is particularly excellent in this range.

[Description of Embodiments of Invention]

The embodiments of the present invention will now be specifically described. It should be understood that the present invention is not limited to the contents described below but by the claims, and is intended to include all modifications within the scope of the claims and equivalents thereof.

Figure 2:
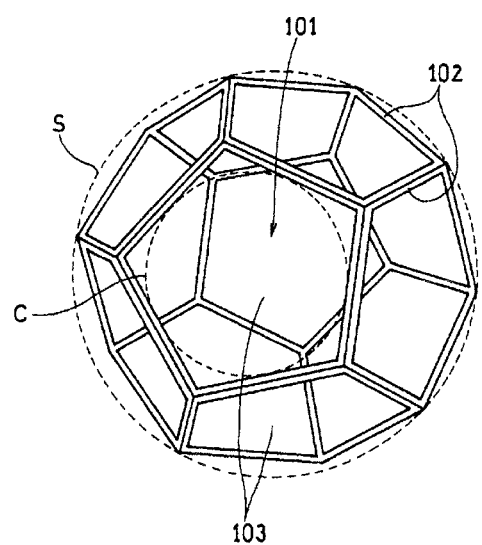
FIG. 2 is a schematic diagram of an example of a structure of a part of a skeleton of a porous metal body.
Figure 3:
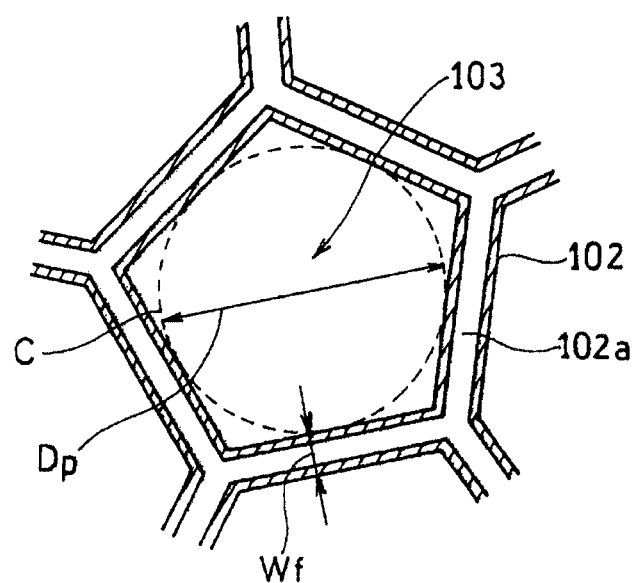
FIG. 3 is a schematic cross-sectional view of a part of the skeleton illustrated in FIG. 2.
Figure 4:
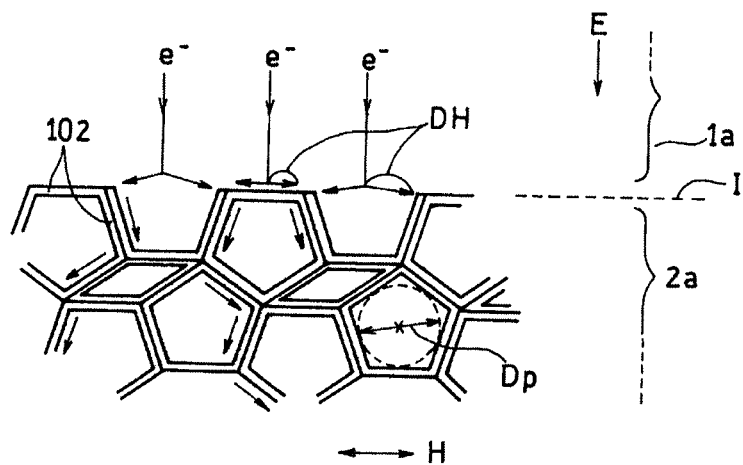
FIG. 4 is a schematic diagram illustrating the flow of electrons in a porous metal body.
Figure 4:
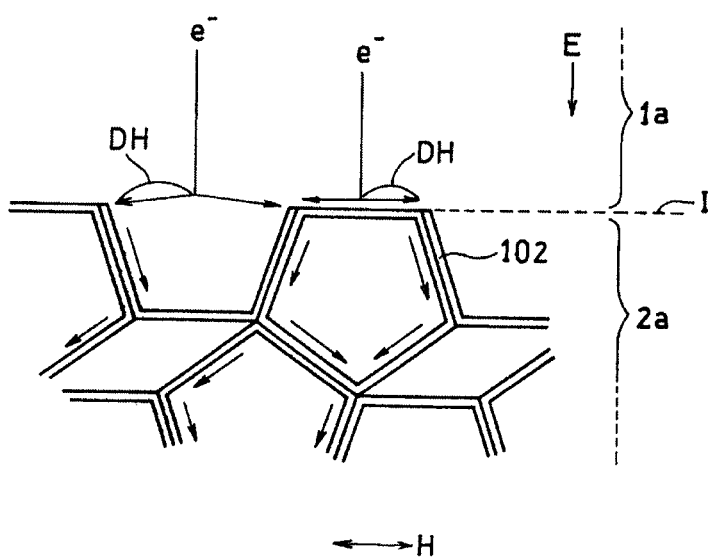

The fuel cell will now be described with reference to FIGS. 1 to 4. FIG. 1 is a schematic cross-sectional view of a fuel cell according to one embodiment. FIG. 2 is a schematic diagram illustrating an example of a structure of a portion of a skeleton of a porous metal body; and FIG. 3 is a schematic cross-sectional view of a portion of the skeleton. FIG. 4 is a schematic diagram illustrating the flow of electrons in a porous metal body.

(Fuel Cell)

As illustrated in FIG. 1, a fuel cell 10 includes a MEA 1. The MEA 1 includes a cathode 1c, an anode 1a, and a solid electrolyte layer that is disposed between the cathode 1c and the anode 1a and contains an ion-conducting solid oxide (hereinafter this layer is referred to as a solid electrolyte layer 1b). A first porous metal body 2a having a three-dimensional mesh-like skeleton is arranged so as to be adjacent to the anode 1a. A second porous metal body 2b having a three-dimensional mesh-like skeleton is arranged so as to be adjacent to the first porous metal body 2a. An interconnector 3a is arranged to be adjacent to the second porous metal body 2b. In the example illustrated in the drawings, a cathode-side interconnector 3b having a gas channel 4 is arranged to be adjacent to the cathode 1c.

In this embodiment, a pore size D1 of the first porous metal body 2a is set to be smaller than a pore size D2 of the second porous metal body 2b. When the first porous metal body 2a having a small pore size is adjacent to the electrode, the amount of the metal material in contact with the electrode increases, and the resistance decreases. When the second porous metal body 2b having a large pore size is adjacent to the interconnector, the pressure loss decreases and the gas diffusing performance is enhanced. In other words, by using a combination of multiple porous metal bodies with different pore sizes, excellent current collecting property and gas diffusing property are both achieved, and the power generation performance of the fuel cell 10 is improved.

In order to increase the fuel gas utilization ratio, it is necessary to evenly diffuse the fuel gas throughout the surface of the anode 1a. As described below, the first porous metal body 2a and the second porous metal body 2b have continuous pores, and have excellent gas diffusing properties. Thus, the fuel gas evenly diffuses within the second porous metal body 2b having a large pore size and then evenly diffuses within the first porous metal body 2a also. Thus, the evenly diffused fuel gas is supplied to the surface of the anode 1a from the first porous metal body 2a. Moreover, as with the first porous metal body 2a, the second porous metal body 2b also has a three-dimensional mesh-like skeleton and thus has excellent electrical conductivity.

In the example illustrated in the drawing, the first porous metal body 2a is arranged to be adjacent to the anode 1a; however, this arrangement is not limiting. The first porous metal body 2a may be arranged to be adjacent to the cathode 1c; alternatively, multiple first porous metal bodies 2a may be arranged to be adjacent to the anode 1a and the cathode 1c. In particular, the first porous metal body 2a is preferably arranged to be adjacent to at least the anode 1a since the operating cost is reduced by the enhanced efficiency of using the fuel gas. Moreover, the material for the porous metal body is not significantly limited since the anode 1a side is in a reducing atmosphere. From this viewpoint also, the first porous metal body 2a is preferably arranged to be adjacent to the anode 1a. In the description below, an example in which the first porous metal body 2a is arranged to be adjacent to the anode 1a is described.

(Porous Metal Body)

The first porous metal body 2a and the second porous metal body 2b each have a three-dimensional mesh-like skeleton, for example, a structure resembling a non-woven fabric or a sponge. Such a structure has a void and a metal skeleton. For example, a porous metal body having a sponge-like structure is constituted by multiple cells each having a void and a metal skeleton.

One of the cells can be represented by, for example, a regular dodecahedron as illustrated in FIG. 2. A void 101 is defined by a fiber- or rod-like metal portion (fiber portion 102), and multiple metal portions are linked three-dimensionally. The skeleton of the cell is formed by fiber portions 102 that are connected to one another. A substantially pentagonal opening (or window) 103 surrounded by the fiber portions 102 is formed in the cell. Adjacent cells are in communication with each other by sharing one opening 103. In other words, the skeleton of the porous metal body is formed by the fiber portions 102 that form a mesh-like network while defining the voids 101 that are arranged continuously. A skeleton that has such a structure is referred to as a three-dimensional mesh-like skeleton.

As illustrated in FIG. 3, the fiber portion 102 may have a hollow space 102a inside, in other words, the fiber portion 102 may be hollow. The porous metal body that has a hollow skeleton is extremely light-weight despite having a bulky three-dimensional structure.

Such a porous metal body can be formed by coating a resin porous body having continuous pores with a metal, for example. Coating with metal can be performed by, for example, a plating method, a vapor phase method (vapor deposition, plasma chemical vapor deposition, sputtering, or the like), or application of a metal paste. A three-dimensional mesh-like skeleton is formed by the metal coating treatment. In particular, a plating method is preferably employed for metal coating.

The plating method may be any method that can form a metal layer on the surfaces (including the surfaces in the inside spaces) of the resin porous body, and a known plating method, for example, an electroplating method, a molten salt plating method, or the like, can be employed. A three-dimensional mesh-like porous metal body corresponding to the shape of the resin porous body is formed by the plating method. In other words, the pore size of the porous metal body obtained can be controlled by the pore size of the resin porous body. Meanwhile, in the case of a sintered body of metal powder, the type, particle diameter, blend ratio, etc., of the binder powder to be mixed affect the pore size. Thus, it is extremely difficult to control the pore size of the sintered bodies.

When a plating treatment is performed by the electroplating method, it is preferable to form a conductive layer before electroplating. The conductive layer may be formed by performing electroless plating, vapor deposition, or sputtering on the surface of the resin porous body, or by application of a conductive agent or immersing a resin porous body in a dispersion containing a conducting agent.

The resin porous body may be any body having continuous pores, and a resin foam, a resin non-woven fabric, or the like can be used. In particular, a resin foam is preferable since continuous pores can be easily formed in the porous metal body to be obtained. The resin constituting the porous bodies such as the resin foam is preferably a resin that can be decomposed or dissolved, for example, so that the inside of the skeleton 102 can be made hollow while maintaining the shape of the metal three-dimensional mesh-like skeleton. Examples thereof include thermosetting resin such as thermosetting polyurethane and melamine resin; and thermoplastic resin such as olefin resin (polyethylene, polypropylene, etc.), and thermoplastic polyurethane. Among these, thermosetting polyurethane is preferably used from the viewpoint of ease of forming voids having more uniform size and shape.

The resin inside the skeleton is preferably removed by decomposition or dissolution by a heat treatment or the like. After the heat treatment, the components (the resin, decomposition products, unreacted monomers, additives contained in the resin, etc.) remaining inside the skeleton may be removed by washing or the like. The resin may be removed by performing a heat treatment while applying voltage as appropriate and as necessary. The heat treatment may be performed under application of voltage while a plated porous body is immersed in a molten salt plating bath.

When the resin inside is removed after the metal coating treatment as such, a hollow space is formed inside the skeleton of the porous metal body, and the skeleton becomes hollow. The porous metal body obtained as such has a skeleton having a three-dimensional mesh-like structure that corresponds to the shape of the resin foam. Commercially available porous metal bodies that can be used include "Aluminum CELMET" (registered trademark) and "CELMET" (registered trademark) formed of copper or nickel produced by Sumitomo Electric Industries, Ltd.

(First Porous Metal Body)

The pore size D1 of the first porous metal body 2a is smaller than the pore size D2 of the second porous metal body 2b (D1<D2). Thus, the first porous metal body 2a has gas diffusing performance and high current collecting performance.

The pore sizes D (D1 and D2) are determined as follows, for example. First, one opening 103a is selected at random from the openings 103 of the porous metal body; the diameter Dp of a largest perfect circle C (refer to FIG. 2) to fit in the opening 103a, and the diameter of a smallest perfect circle that can contain the opening 103a are measured; and the average thereof is determined. The obtained average is assumed to be the pore size Da of the opening 103a. In the same manner, the pore sizes Db to Dj of any desired number (for example, nine) of other openings 103b to 103j of the porous metal body are determined, and the average of the pore sizes Da to Dj of the ten openings 103a to 103j is assumed to be the pore size Ds.

Specifically, in a SEM image of a main surface of the porous metal body S, a region R that includes 10 or more whole openings 103 is determined. Of the openings 103 included in the region R, for example, 10 openings are selected at random, and the pore sizes Da to Dj of the openings 103a to 103j are calculated by the method described above. The average of the pore sizes Da to Dj of the openings 103a to 103j calculated is assumed to be the pore size D.

At least one of the first porous metal body 2a and the second porous metal body 2b may be formed by combining multiple porous metal bodies. In such a case, the pore size of the entire first porous metal body 2a or the second porous metal body 2b is determined by taking into account the pore sizes and the volume ratios of the porous metal bodies $2_1$ to $2_n$ constituting the first porous metal body 2a or the second porous metal body 2b. For example, the pore size D1 is determined by (pore size of porous metal body $2a_1$×volume ratio of first porous metal body 2a occupied by porous metal body $2a_1$+ . . . +pore size of porous metal body $2a_n$×volume ratio of first porous metal body 2a occupied by porous metal body $2a_n$). The pore size of the entire first porous metal body 2a calculated as such is smaller than the pore size of the entire second porous metal body 2b. When at least one of the first porous metal body 2a and the second porous metal body 2b is formed of multiple porous metal bodies, the physical property values described below are determined by taking into account the volume ratio of each porous metal body, as described above.

Electrons flow from lower potential to higher potential. Thus, when multiple MEAs 1 are stacked, electrons flow in a direction from the anode 1a toward the cathode 1c of the adjacent MEA 1, that is, in FIGS. 4A and 4B, in a direction E from the anode 1a toward the first porous metal body 2a.

Electrons do not smoothly flow in a direction H (in FIG. 4, the direction close to a horizontal direction) in which the change in potential is small. In other words, the resistance is high in the direction H.

As illustrated in FIGS. 4A and B, electrons (e⁻) generated at the anode 1a and at an interface I between the anode 1a and the first porous metal body 2a move to fiber portions 102 that form the skeleton of the first porous metal body 2a, pass through the fiber portions 102, and move toward the cathode 1c (not illustrated) of the adjacent MEA 1. The fiber portions 102 form a mesh-like network. Thus, in some cases, electrons at the interface I have to move in the direction H, in which the change in potential is small, in order to reach the fiber portions 102 that extend in the direction E. Thus, as illustrated in FIG. 4A, by decreasing the pore size D and increasing the number of passages (fiber portions 102) for the electrons, a travel distance DH of electrons in the direction H needed to reach the fiber portions 102 extending in the direction E can be decreased. As a result, the resistance is decreased, and the current collecting property is improved. When the pore size D is small, the travel distance DH of the electrons in the direction H needed for the electrons to travel in the direction E is decreased even after the electrons have temporarily flowed into the first porous metal body 2a.

When the pore size is large, as illustrated in FIG. 4B, electrons must travel extensively in the direction H before they reach the fiber portions 102 that extend in the direction E, and thus, the resistance is increased.

Since the first porous metal body 2a has a small pore size, the irregularities on the surface are also small. Thus, the contacting property to the anode 1a can be enhanced. Since the first porous metal body 2a has a three-dimensional mesh-like skeleton, it readily undergoes plastic deformation. Thus, the contacting property to the anode 1a can be enhanced without damaging the anode 1a. Thus, the current collecting property is further enhanced.

The pore size D1 of the first porous metal body 2a is not particularly limited as long as it is smaller than the pore size D2 of the second porous metal body 2b. In particular, from the viewpoints of the resistance and the current collecting property, the pore size D1 is preferably 100 to 1000 μm and more preferably 100 to 500 μm.

The porosity P1 of the first porous metal body 2a is not particularly limited. In particular, from the viewpoint of the gas diffusing property, the porosity P1 is preferably 70 vol % or more, more preferably 80 vol % or more, and yet more preferably 85 vol % or more. The porosity P1 is less than 100 vol %, may be 99.5 vol % or less, or may be 99 vol % or less. These lower limit values and the upper limit values can be combined as desired. The porosity (vol %) is determined by {1−(apparent specific gravity of porous metal body/true specific gravity of metal)}×100.

The size (cell size) V1 of the void 101 in the first porous metal body 2a is not particularly limited. The cell size V1 may be, for example, 100 to 1500 μm or may be 200 to 1000 μm. The cell size V1 is, for example, determined as follows. First, one void 101a is selected at random from the voids 101 of the porous metal body; the diameter of a largest perfect sphere to fit in the void 101a, and the diameter of a smallest sphere S (refer to FIG. 2) that can contain the void 101a are measured; and the average thereof is determined. The result is assumed to be the cell size Va of the void 101a. In the same manner, the cell sizes Vb to Vj of any desired number (for example, nine) of other voids 101b to 101j of the porous metal body are determined, and the average of the pore sizes Va to Vj of the ten voids 101a to 101j is assumed to be the cell size V1.

Specifically, in a SEM image of a main surface of the porous metal body, a region V that includes 10 or more whole voids 101 is determined. Of the voids 101 included in the region V, for example, 10 voids are selected at random, and the cell sizes Va to Vj of the voids 101a to 101j are calculated by the method described above. The average of the cell sizes Va to Vj of the voids 101a to 101j calculated is assumed to be the cell size V1.

The metal constituting the first porous metal body 2a may be appropriately selected according to the service environment. For example, when the first porous metal body 2a is disposed to be adjacent to the anode 1a, the type of the metal is not particularly limited. Examples of the metal include copper (Cu), Cu alloys (alloys of copper with, for example, iron (Fe), nickel (Ni), silicon (Si), manganese (Mn), and the like), Ni or Ni alloys (alloys of Ni with, for example, tin (Sn), chromium (Cr), tungsten (W), and the like), aluminum (Al) or Al alloys (alloys of Al with, for example, Fe, Ni, Si, Mn, and the like), and stainless steel. When the first porous metal body 2a is disposed to be adjacent to the cathode 1c, the first porous metal body 2a is preferably formed of an alloy of Ni and a metal, such as Cr, that has high oxidation resistance.

The specific surface area (BET specific surface area) of the first porous metal body 2a is also not particularly limited. The specific surface areas of the first porous metal body 2a may be, for example, 100 to 9000 $m^2/m^3$ or 200 to 6000 $m^2/m^3$.

The density C1 of the openings 103 in the first porous metal body 2a is also not particularly limited. In particular, from the viewpoint of resistance, the density C1 is preferably 10 to 100 openings/2.54 cm and more preferably 30 to 80 openings/2.54 cm. The density C1 refers to the number of the opening 103 that lie on a straight line having a length of 1 inch (2.54 cm) drawn on the surface of the porous metal body.

The width Wf1 of the fiber portions 102 in the first porous metal body 2a is also not particularly limited. In particular, from the viewpoints of the current collecting property, the width Wf1 is preferably 3 to 500 μm and more preferably 10 to 500 μm.

The thickness T1 of the first porous metal body 2a is also not particularly limited. In particular, from the viewpoints of the electrical resistance and the gas diffusing property, the thickness T1 is preferably 0.1 to 5 mm and more preferably 0.5 to 2 mm. The thickness T1 is, for example, an average value of the thicknesses at any ten points of the first porous metal body 2a.

(Second Porous Metal Body)

The pore size D2 of the second porous metal body 2b is not particularly limited as long as it is larger than the first porous metal body 2a. In particular, from the viewpoint of the gas diffusing property, the pore size D2 is preferably 500 to 3000 μm and more preferably 500 to 1500 μm. In particular, from the viewpoint of the balance between the electrical resistance and the gas diffusing property, the ratio (pore size D1/pore size D2) of the pore size D1 of the first porous metal body 2a to the pore size D2 of the second porous metal body 2b is preferably 0.05 to 0.8 and more preferably 0.3 to 0.6. The pore size D2 can be determined as with the pore size D1.

Although the porosity P2 of the second porous metal body 2b is not particularly limited, it is preferably equal to or more than that of the first porous metal body 2a from the viewpoint of the gas diffusing property. The porosity P2 is, for example, 85 vol % or more, is preferably 90 vol % or more, and is yet more preferably 95 vol % or more. The porosity P2 is less than 100 vol %, may be 99.5 vol % or less, or may be 99 vol % or less. These lower limit values and the upper limit values can be combined as desired.

Although the cell size V2 of the voids 101 in the second porous metal body 2b is also not particularly limited, it is preferably larger than that of the first porous metal body 2a from the viewpoint of the gas diffusing property. The cell size V2 is preferably 500 to 3000 μm and more preferably 500 to 1500 μm. The cell size V2 can be determined as with the cell size V1.

The density C2 of the openings 103 in the second porous metal body 2b is not particularly limited. In particular, from the viewpoints of the gas diffusing property and the pressure loss, the density C2 is preferably 5 to 50 openings/2.54 cm and more preferably 10 to 40 openings/2.54 cm.

The metal constituting the second porous metal body 2b may be appropriately selected according to the service environment. The metal constituting the first porous metal body 2a and the metal constituting the second porous metal body 2b may be the same or different. Examples of the metal include the same metals as those described as examples for the first porous metal body 2a.

The specific surface area (BET specific surface area) of the second porous metal body 2b is also not particularly limited. The specific surface area of the first porous metal body 2a and specific surface area of the second porous metal body 2b may be the same or different. The specific surface area of the second porous metal body 2b may be, for example, 100 to 9000 $m^2/m^3$ or 200 to 6000 $m^2/m^3$.

The width Wf2 of the fiber portions 102 in the second porous metal body 2b is also not particularly limited. In particular, from the viewpoint of pressure loss, the width Wf2 is preferably 5 to 50 μm and more preferably 10 to 30 μm. The width Wf of the skeleton 102 of the first porous metal body 2a and the width Wf of the skeleton 102 of the second porous metal body 2b may be the same or different.

The thickness T2 of the second porous metal body 2b is also not particularly limited. In particular, from the viewpoints of the balance between the electrical resistance and the gas diffusing property, the thickness T2 is preferably 0.1 to 5 mm and more preferably 0.5 to 2.5 mm. From the same viewpoints, the ratio (T1/T2) of the thickness T1 of the first porous metal body 2a to the thickness T2 of the second porous metal body 2b is preferably 0.2 to 1 and more preferably 0.4 to 0.8.

From the viewpoints of the current collecting property, the gas diffusing property, and the productivity, the first porous metal body 2a and the second porous metal body 2b are preferably bonded by entanglement of the skeletons thereof. Entanglement of the skeletons can be, for example, a state in which a portion near an end of the fiber portion 102 of the second porous metal body 2b is inserted into the opening 103 present near a portion near an end of the first porous metal body 2a. Alternatively, it can be a state in which the fiber portions 102 that are present near the ends of the porous metal bodies are plastically deformed and engaged. In this manner, the first porous metal body 2a and the second porous metal body 2b are strongly bonded to each other near the main surfaces thereof without requiring an adhesive therebetween. Thus, the first porous metal body 2a and the second porous metal body 2b become electrically coupled and become communicated with each other.

A composite material in which the first porous metal body 2a and the second porous metal body 2b are bonded can be obtained by stacking a precursor (first precursor) of the first porous metal body 2a and a precursor (second precursor) of the second porous metal body 2b, and press-forming the resulting stack, for example. The porosity, the pore size, and the cell size of each precursor can decrease by 2 to 10%, respectively, due to the press forming. Thus, the porosity, the pore size, and the cell size of each precursor are preferably appropriately set so that the porosity, the pore size and the cell size of each of the first porous metal body 2a and the second porous metal body 2b after press forming are within the desired ranges. The porosity, the pore size, and the cell size of the precursor can be determined as with the porosity, the pore size, and the cell size of the first porous metal body 2a.

The method for press forming is not particularly limited, and may be, for example, roll pressing, flat pressing, or the like. The press forming may be performed under heating. In particular, from the viewpoints of cost and production efficiency, the first precursor and the second precursor are preferably bonded by roll pressing at room temperature. The pressing pressure is not particularly limited and may be set as appropriate. The pressing pressure may be, for example, 0.1 to 5 MPa or may be 1 to 5 MPa.

(MEA)

The MEA 1 includes the cathode 1c, the anode 1a, and the solid electrolyte layer 1b interposed between the cathode 1c and the anode 1a and having ion conductivity. The cathode 1c, the anode 1a, and the solid electrolyte layer 1b are integrated by sintering, for example.

(Cathode)

The cathode 1c has a porous structure capable of adsorbing oxygen molecules and ionizing them. Examples of the material for the cathode 1c include known materials used in the cathodes of fuel cells, gas decomposition devices, and hydrogen production apparatuses. The material for the cathode 1c is, for example, a compound containing lanthanum and having a perovskite structure. Specific examples thereof include lanthanum strontium cobalt ferrite (LSCF, $La_{1-a}Sr_aFe_{1-b}Co_bO_{3-\delta}$, $0.2 \leq a \leq 0.8$, $0.1 \leq b \leq 0.9$, where δ represents an oxygen vacancy concentration), lanthanum strontium manganite (LSM, $La_{1-c}Sr_cMnO_{3-\delta}$, $0.2 \leq c \leq 0.8$, where δ represents an oxygen vacancy concentration), and lanthanum strontium cobaltite (LSC, $La_{1-d}Sr_dCoO_{3-\delta}$, $0.2 \leq d \leq 0.8$, where δ represents an oxygen vacancy concentration).

The cathode 1c may contain a catalyst such as nickel, iron, or cobalt. When a catalyst is contained, the cathode 1c can be formed by mixing the above-described material with a catalyst, and sintering the resulting mixture. The thickness of the cathode 1c is not particularly limited and may be about 5 μm to 100 μm.

(Anode)

The anode 1a has an ion-conducting porous structure. For example, in the protonically conductive anode 1a, a reaction (oxidation reaction of a fuel) of oxidizing a fuel, such as hydrogen, introduced from the channel described below so as to release hydrogen ions (protons) and electrons is performed.

Examples of the material for the anode 1a include known materials used in the anodes of fuel cells, gas decomposition devices, and hydrogen production apparatuses. Specific examples thereof include composite oxides between nickel oxide (NiO), which is a catalyst component, and a solid oxide, such as yttrium oxide ($Y_2O_3$), yttria-stabilized zirconia (YSZ, $ZrO_2$—$Y_2O_3$), yttrium-doped barium zirconate (BZY, $BaZr_{1-e}Y_eO_{3-\delta}$, $0.05 \leq e \leq 0.25$ where δ represents an oxygen vacancy concentration), yttrium-doped barium cerate (BCY, $BaCe_{1-f}Y_fO_{3-\delta}$, $0.05 \leq f \leq 0.25$, where δ represents an oxygen vacancy concentration), a mixed oxide of yttrium-doped barium zirconate and barium cerate (BZCY, $BaZr_{1-g-h}Ce_gY_hO_{3-\delta}$, $0<g<1$, $0.05 \leq h \leq 0.25$, where $\delta$ represents an oxygen vacancy concentration). The anode 1a that contains such a composite oxide can be formed by, for example, mixing NiO powder and powder of the above-described solid oxide or the like, and sintering the resulting mixture.

The thickness of the anode 1a may be, for example, about 10 μm to 1000 μm. The anode 1a may have a large thickness so as to function as a support of the MEA 1. FIG. 1 illustrates the case in which the thickness of the anode 1a is made larger than that of the cathode 1c so that the anode 1a functions as a support of the MEA 1. The thickness of the anode 1a is not limited to this, and may be, for example, the same as the thickness of the cathode 1c.

(Solid Electrolyte Layer)

The solid electrolyte layer 1b contains an ion-conducting solid oxide. The ions moving in the solid electrolyte layer 1b are not particularly limited, and may be oxide ions or protons. In particular, the solid electrolyte layer 1b preferably has a proton conductivity. Protonic ceramic fuel cells (PCFCs) can operate at an intermediate temperature zone of 400 to 600° C., for example. Thus, PCFCs can be used in a wide variety of usages.

Examples of the material for the solid electrolyte layer 1b are the same as the solid oxides described as the examples of the material for the anode 1a, for example. The thickness of the solid electrolyte layer 1b is not particularly limited but is preferably about 5 μm to 100 μm since the resistance can be suppressed low.

(Method for Producing MEA)

A method for producing the MEA 1 is not particularly limited, and any known method can be used. For example, a method that includes a step of press-forming an anode material, a step of stacking a solid-oxide-containing solid electrolyte material on one side of the resulting anode formed body and sintering the resulting stack, and a step of stacking a cathode material on a surface of the sintered solid electrolyte material and sintering the resulting stack can be employed. In the MEA 1 produced as such, the anode 1a, the solid electrolyte layer 1b, and the cathode 1c are integrated.

The step of stacking the solid electrolyte material is performed by applying, to one side of an anode formed body, a paste obtained by mixing powder of a solid electrolyte material and a water-soluble binder resin by screen-printing, spray-coating, spin-coating, dip-coating or the like. The cathode material can be stacked on the surface of the solid electrolyte in the same manner.

Sintering of the solid electrolyte material is performed by heating a stack, which includes the anode formed body and the solid electrolyte material, in an oxygen atmosphere to, for example, 1300 to 1500° C. The oxygen content in the sintering atmosphere is not particularly limited and may be 50 vol % or more or 60 vol % or more. The heating temperature is preferably 1350 to 1450° C. Sintering can be performed under a normal pressure or an increased pressure.

Prior to stacking the solid electrolyte material, the anode material may be calcined. Calcining may be performed at a temperate (for example, 900 to 1100° C.) lower than the temperature for sintering the anode material. Calcining facilitates stacking of the solid electrolyte material.

Prior to sintering the solid electrolyte material, resin components such as a binder contained in each material may be removed. In other words, after the cathode material is stacked, heating to a relatively low temperature of 500 to 800° C. is performed in air so as to remove the resin components contained in the materials. Subsequently, the stack may be heated to 1300 to 1500° C. in an oxygen atmosphere to sinter the materials.

Sintering of the cathode material is performed by sintering a stack, which includes the cathode material and the anode formed body with the solid electrolyte layer thereon, in an oxygen atmosphere at 800 to 1100° C., for example. The oxygen content in the sintering atmosphere is not particularly limited, and may be, for example, within the above-described range.

Sintering can be performed under a normal pressure or an increased pressure.

(Interconnector)

The interconnectors 3a and 3b separate fuel gas and air from each other. A MEA 1, porous metal bodies 2 (2a and 2b), and interconnectors 3a and 3b are combined to form one structure unit. When the fuel cell 10 includes two or more such structure units that are stacked, one surface of the interconnector may be arranged to contact the second porous metal body 2b and the other surface may be arranged to contact one surface of the MEA 1.

Examples of the material for the interconnectors 3a and 3b include, from the viewpoints of conductivity and heat resistance, heat resistant alloys such as stainless steels, nickel-based alloys, and chromium-based alloys. In the case of the PCFC which has an operation temperature of about 400 to 600° C., inexpensive stainless steel can be used as the material for the interconnector. The material for the interconnector 3a and the material for the interconnector 3b may be the same or different.

Since the second porous metal body 2b has an excellent gas diffusing property, there is no need to form a gas channel in the surface of the interconnector 3a adjacent to the second porous metal body 2b, the surface opposing the second porous metal body 2b; and this surface may be smooth and flat. Smooth and flat means that the surface does not have irregularities sufficient to function as a gas channel.

As a result, even when a chromium-based alloy, which has low workability, is used in the interconnector 3a, the interconnector can function as the interconnector without requiring etching. Thus, the productivity is improved, and the cost is reduced. Note that when the fuel cell 10 includes stacked cells, a gas channel may be formed in a surface (the surface in contact with the MEA 1) of the interconnector not in contact with the second porous metal body 2b.

The porous metal body that has a three-dimensional mesh-like skeleton described above is suitable not only for use in fuel cells but also for use in producing hydrogen by electric decomposition (electrolysis) of water. The hydrogen production methods are roughly categorized into (1) an alkaline water electrolysis method that uses an alkaline aqueous solution, (2) a polymer electrolyte membrane (PEM) method, and (3) a solid oxide electrolysis cell (SOEC) method; and the porous metal body described above can be used in any of these methods. Examples of such a porous metal body include the first porous metal body 2a, the second porous metal body 2b, other porous metal bodies that have three-dimensional mesh-like skeletons, and any combination of the foregoing (the same applies hereinafter).

(1) The alkaline water electrolysis method involves immersing an anode and a cathode in an alkaline aqueous solution (preferably a strong alkaline aqueous solution) and applying voltage between the anode and the cathode to electrolyze water. In this case, the porous metal body is used in at least one of the electrodes. At the anode, hydroxyl ions are oxidized, and oxygen and water are generated. At the cathode, hydrogen ions are reduced, and hydrogen is generated. Since the porous metal body has a large surface area, the contact area between the ions and the porous metal body is large, and the water electrolysis efficiency is improved. Moreover, since the porous metal body has excellent electrical conductivity, the water electrolysis efficiency is further improved. In addition, since the porous metal body has high porosity, hydrogen and oxygen generated can rapidly desorb. The improvement in the water electrolysis efficiency can be expected from this point also.

The metal that constitutes the porous metal body is not particularly limited, and examples of the metal include those metals described as the examples of the metal that constitutes the first porous metal body 2a or the second porous metal body 2b. In particular, the porous metal body to be used as the cathode preferably contains Ni or an Ni alloy, which is low-cost and has excellent catalytic ability for the hydrogen generation reaction. The porous metal body to be used as the anode preferably contains platinum from the viewpoint of catalytic activity.

The pore size of the porous metal body is preferably 100 µm or more and 5000 µm or less from the same viewpoint. As long as the pore size of the porous metal body is within this range, hydrogen or oxygen generated at each electrode can rapidly desorb, thereby further improving the electrolysis efficiency and ensuring a sufficient contact area between each electrode and hydrogen ions or hydroxyl ions. The pore size of the porous metal body is preferably 400 µm or more and 4000 µm or less from the same viewpoint. Considering the desorption of bubbles, water retention, and electrical connection, multiple porous metal bodies with different porosities (for example, the first porous metal body 2a and the second porous metal body 2b) may be combined to form one electrode. In such a case, the porous metal bodies that are stacked are preferably bonded with one another by entanglement of their skeletons at the interfaces. The porous metal body may be used in combination with another porous metal body.

The thickness and the mass per unit area (metal content) of the porous metal body may be appropriately set according to the scale of the production apparatus. For example, the thickness, the mass per unit area, etc., may be set according to the area of the main surface of each electrode so that warping and the like do not occur.

In order to prevent generated hydrogen and oxygen from becoming mixed with each other, a separator is preferably disposed between the anode and the cathode. The material for the separator may be any material that has wettability, ion permeability, alkali resistance, a non-conducive property, air impermeability, thermal stability, etc. Examples of the material for such a separator include fluororesins impregnated with potassium titanate, polyantimonic acid, polysulfone, hydrophilized polyphenylene sulfide, polyvinylidene fluoride, and polytetrafluoroethylene. When multiple structure units each including an anode, a cathode, and a separator are stacked and used, a separator such as one described above is preferably placed between the structure units from the viewpoint of preventing short-circuiting.

The solute of the alkaline aqueous solution is not particularly limited, and examples thereof include hydroxides of alkali metals (lithium, sodium, potassium, rubidium, cesium, and francium) and alkaline earth metals (calcium, strontium, barium, and radium). Among these, hydroxides of alkali metals (in particular, NaOH and KOH) are preferable since a strong alkaline aqueous solution is obtained. The concentration of the alkaline aqueous solution is not particularly limited, and may be 20 to 40 mass % from the viewpoint of the electrolysis efficiency. The operation temperature is, for example, about 60 to 90° C., and the current density is, for example, about 0.1 to 0.3 A/cm$^2$.

(2) The PEM method involves electrolyzing water by using a polymer electrolyte membrane. Specifically, according to the PEM method, an anode and a cathode are respectively placed on two surfaces of a polymer electrolyte membrane, and water is introduced to the anode while applying voltage between the anode and the cathode so as to electrolyze the water. In this case, the porous metal body is used at least in the anode. Since the anode side and the cathode side are completely separated from each other by the polymer electrolyte membrane according to the PEM method, there is an advantage in that hydrogen can be extracted at high purity compared to the alkaline water electrolysis method (1). Moreover, the porous metal body has a large surface area and excellent electrical conductivity. Thus, the porous metal body is suitable for use in an anode of a hydrogen production apparatus (PEM hydrogen production apparatus) that employs the PEM method.

Protons generated from the PEM hydrogen production apparatus pass through the polymer electrolyte membrane, move to the cathode, and are extracted as hydrogen at the cathode side. In other words, the PEM hydrogen production apparatus utilizes a completely reverse reaction from the solid polymer fuel cell, in which power is generated by reacting hydrogen and oxygen and water is discharged, but has a similar structure. The operation temperature of the PEM hydrogen production apparatus is about 100° C. Examples of the polymer electrolyte membrane that can be used include protonically conductive polymers, such as perfluorosulfonic acid polymer, that are used in solid polymer fuel cells or PEM hydrogen production apparatuses of the related art. The cathode also preferably contains the porous metal body since hydrogen generated can rapidly desorb.

The metal that constitutes the porous metal body is not particularly limited, and examples of the metal include those metals described as the examples of the metal that constitutes the first porous metal body 2a or the second porous metal body 2b. In particular, the porous metal body to be used as the anode preferably contains Ni or an Ni alloy, which is low-cost and has excellent catalytic ability for the hydrogen generation reaction. The porous metal body to be used as the cathode preferably contains rhodium from the viewpoint of catalytic activity.

The pore size of the porous metal body is preferably 100 µm or more and 5000 µm or less from the same viewpoint. As long as the pore size of the porous metal body is within this range, hydrogen or oxygen generated at each electrode can rapidly desorb, thereby further improving the electrolysis efficiency and enhancing the water retention. In particular, when the anode has poor water retention, water passes through the anode before it sufficiently reacts with the anode; thus, the electrolysis efficiency is easily degraded. The pore size of the porous metal body is preferably 400 µm or more and 4000 µm or less from the same viewpoint. Considering the desorption of bubbles, water retention, and electrical connection, multiple porous metal bodies with different porosities may be stacked to form one electrode. In particular, the anode is preferably formed by combining the first porous metal body 2a and the second porous metal body 2b. In this case, the first porous metal body 2a is arranged on the polymer electrolyte membrane side. In this manner, the water electrolysis efficiency is further improved. Furthermore, the porous metal bodies that are stacked are preferably bonded with one another by entanglement of their skeletons at the interfaces. The porous metal body may be used in combination with another porous metal body.

The thickness and the mass per unit area of the porous metal body may be appropriately set according to the scale of the production apparatus. In particular, the thickness and the mass per unit area are preferably adjusted so that the porosity of the porous metal body is 30% or more. This is because when the porosity of the porous metal body is smaller than 30%, the pressure loss that occurs when water flows inside the porous metal body is increased.

According to this method, the polymer electrolyte membrane and the porous metal bodies used as the electrodes become in communication with one another by pressure bonding. Thus, the masses of the porous metal bodies per unit area are preferably adjusted so that the deformation of the electrodes during pressure bonding and the increase in electrical resistance due to creeping are within the range that does not cause practical problem. The mass per unit area of the porous metal body is preferably 400 $g/m^2$ or more.

(3) The SOEC method (also called a steam electrolysis method) is a method of electrolyzing steam by using a solid oxide electrolyte membrane. Specifically, according to the SOEC method, an anode and a cathode are respectively placed on two surfaces of a solid oxide electrolyte membrane, and steam is introduced to one of the electrodes while applying voltage between the anode and the cathode so as to electrolyze the steam.

According to the SOEC method, to which electrode steam is introduced depends on whether the solid oxide electrolyte membrane is protonically conductive or oxide ion conductive. When the solid oxide electrolyte membrane is oxide ion conductive, steam is introduced to the cathode. Steam is electrolyzed at the cathode, and protons and oxide ions are generated. The generated protons are reduced at the cathode and extracted as hydrogen. The oxide ions pass through the solid oxide electrolyte membrane, move to the anode, become oxidized at the anode, and are extracted as oxygen. When the solid oxide electrolyte membrane is protonically conductive, steam is introduced to the anode. Steam is electrolyzed at the anode, and protons and oxide ions are generated. The generated protons pass through the solid oxide electrolyte membrane, move to the cathode, become reduced at the cathode, and are extracted as hydrogen. The oxide ions are reduced at the anode and extracted as oxygen.

In the SOEC method, the porous metal body described above is used as the electrode to which steam is introduced. Since the porous metal body has a large surface area, the contact area between the steam and the electrode is large, and the steam electrolysis efficiency is improved. Moreover, since the porous metal body has excellent electrical conductivity, the steam electrolysis efficiency is further improved.

The solid oxide electrolyte membrane is preferably protonically conductive from the viewpoint of ease of obtaining hydrogen at high purity. This is because when the solid oxide electrolyte membrane is protonically conductive, the electrode to which steam is introduced is different from the electrode from which hydrogen is extracted. In such a case, the porous metal body is used as the anode. The cathode also preferably contains the porous metal body since hydrogen generated can rapidly desorb.

In other words, the hydrogen production apparatus that employs the SOEC method (SOEC hydrogen production apparatus) utilizes a completely reverse reaction from the solid oxide fuel cell, in which power is generated by reacting hydrogen and oxygen and water is discharged, but has a similar structure. The operation temperature of the SOEC hydrogen production apparatus is about 600° C. to 800° C., and oxygen is generated at the anode. Thus, the anode is put in a high-temperature oxidizing atmosphere. Since the porous metal body has high oxidization resistance and heat resistance, the porous metal body is suitable for use as the anode, in particular, of the SOEC hydrogen production apparatus.

The metal that constitutes the porous metal body is not particularly limited, and examples of the metal include those metals described as the examples of the metal that constitutes the first porous metal body 2a or the second porous metal body 2b. In particular, the porous metal body that contains an Ni alloy containing 3 to 30 mass % of a metal, such as Cr, having high oxidization resistance is preferably used in the anode put in an oxidizing atmosphere. The porous metal body to be used as the cathode preferably contains Sn from the viewpoint of electrical resistance.

The pore size of the porous metal body is preferably 100 μm or more and 5000 μm or less from the same viewpoint. As long as the pore size of the porous metal body is within the above-described range, the pressure loss of steam falls within an appropriate range, and electrolysis efficiency is enhanced. When the porous metal body is used in the cathode, generated hydrogen also can rapidly desorb. The pore size of the porous metal body is preferably 400 μm or more and 4000 μm or less from the same viewpoint. Considering the desorption of bubbles, water retention, and electrical connection, multiple porous metal bodies with different porosities may be stacked to form one electrode. In particular, the electrode to which steam is introduced is preferably formed by combining the first porous metal body 2a and the second porous metal body 2b. In this case, the first porous metal body 2a is arranged on the solid oxide electrolyte membrane side. In this manner, the steam electrolysis efficiency is further improved. Furthermore, the porous metal bodies that are stacked are preferably bonded with one another by entanglement of their skeletons at the interfaces. The porous metal body may be used in combination with another porous metal body.

The thickness and the mass per unit area of the porous metal body may be appropriately set according to the scale of the hydrogen production apparatus. In particular, the thickness and the mass per unit area are preferably adjusted so that the porosity of the porous metal body is 30% or more. This is because when the porosity of the porous metal body is smaller than 30%, the pressure loss that occurs when steam flows inside the porous metal body is increased. According to this method, the solid oxide electrolyte membrane and the porous metal bodies used as the electrodes become in communication with one another by pressure bonding. Thus, the masses of the porous metal bodies per unit area are preferably adjusted so that the deformation of the electrodes during pressure bonding and the increase in electrical resistance due to creeping are within the range that does not cause practical problem. The mass per unit area of the porous metal body is preferably 400 $g/m^2$ or more.

Figure 5:
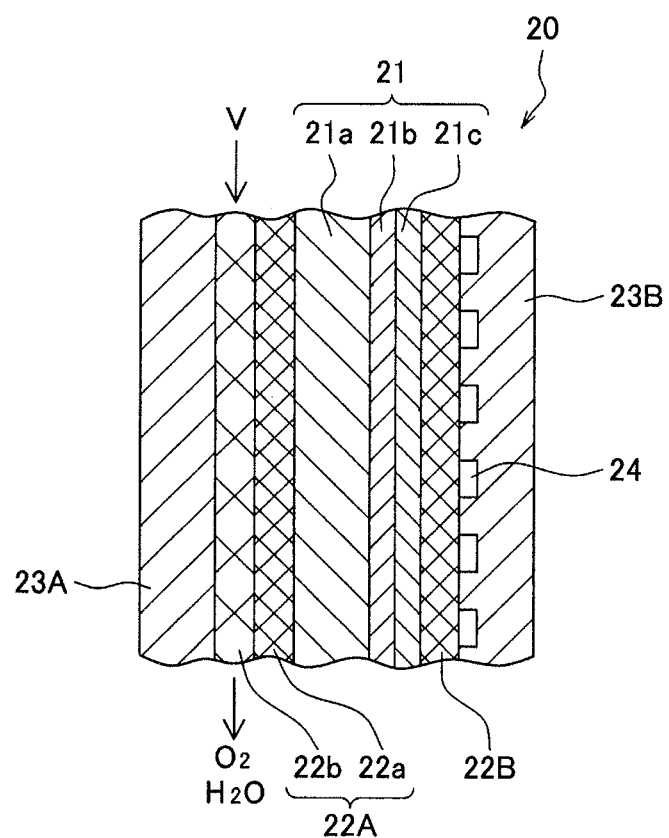
FIG. 5 is a schematic cross-sectional view of a structure of a related part of a hydrogen production apparatus employing a SOEC method.

FIG. 5 is a schematic diagram of a section of a relevant part of a SOEC hydrogen production apparatus 20 that uses a protonically conductive solid oxide electrolyte membrane. In FIG. 5, a power supply is not illustrated. The hydrogen production apparatus 20 includes a structure 21 that includes a solid oxide electrolyte membrane 21b, an anode 22A and a cathode 22B that respectively oppose two main surfaces of the structure 21, a plate member 23A that opposes a main surface of the anode 22A on the opposite side of the structure 21, a plate member 23B that opposes a main surface of the cathode 22B on the opposite side of the structure 21, and a power supply not illustrated in the drawing. Steam V is introduced to the anode 22A.

The anode 22A and the cathode 22B are both a porous metal body that has the above-described three-dimensional mesh-like skeleton. Furthermore, the anode 22A is constituted by a porous metal body 22a and a porous metal body 22b having different pore sizes. The pore size of the porous metal body 22a is smaller than the pore size of the porous metal body 22b. The plate members 23A and 23B are separators arranged to prevent steam and oxygen from mixing with hydrogen.

The SOEC hydrogen production apparatus 20 has the same structure as the fuel cell 10 illustrated in FIG. 1 except for that the apparatus is equipped with the cathode 22B and the power supply. In other words, the porous metal body 22a corresponds to the first porous metal body 2a and the porous metal body 22b corresponds to the second porous metal body 2b. The structure 21 includes the solid oxide electrolyte membrane 21b that contains a protonically conductive solid oxide, and porous layers 21a and 21c that are arranged to respectively oppose the main surfaces of the solid oxide electrolyte membrane 21b. The porous layers 21a and 21c support the solid oxide electrolyte membrane 21b. The solid oxide electrolyte membrane 21b contains a protonically conductive solid oxide, which is the same as an example described as the solid electrolyte layer 1b. As with the anode 1a, the porous layer 21a disposed on the anode 22A side is formed of a composite oxide of the solid oxide and nickel oxide (NiO) serving as a catalyst component. Thus, the electrolysis efficiency is further enhanced. The porous layer 21c is formed of the same compound as one described as examples for the cathode 1c, for example.

The plate members 23A and 23B have structures that correspond to the interconnectors 3a and 3b. A gas channel 24 may be formed in the plate member 23B adjacent to the cathode 22B. In this case, hydrogen generated at the cathode 22B can be extracted through the gas channel 24.

[Notes]

Regarding the hydrogen production apparatus that uses the alkaline water electrolysis method, the following note 1-1 is disclosed.

(Note 1-1)

A hydrogen production apparatus comprising:

an electrolytic bath that contains an alkaline aqueous solution;

an anode and a cathode immersed in the alkaline aqueous solution; and a power supply for applying voltage between the anode and the cathode, wherein at least one of the anode and the cathode includes a porous metal body that has a three-dimensional mesh-like skeleton.

Regarding the method for producing hydrogen by using the alkaline water electrolysis method, the following note 1-2 is disclosed.

(Note 1-2)

A method for producing hydrogen, comprising:

a step of preparing an anode, a cathode, and an alkaline aqueous solution;

a step of immersing the anode and the cathode in the alkaline aqueous solution; and a step of applying voltage between the anode and the cathode, wherein at least one of the anode and the cathode includes a porous metal body that has a three-dimensional mesh-like skeleton.

Regarding the hydrogen production apparatus that uses the PEM method, the following note 2-1 is disclosed.

(Note 2-1)

A hydrogen production apparatus comprising:

an anode;

a cathode;

a polymer electrolyte membrane disposed between the anode and the cathode; and a power supply that applies voltage between the anode and the cathode, wherein at least the anode includes a porous metal body that has a three-dimensional mesh-like skeleton.

Regarding the method for producing hydrogen by using the PEM method, the following note 2-2 is disclosed.

(Note 2-2)

A method for producing hydrogen, comprising:

a step of preparing an anode, a cathode, and a polymer electrolyte membrane disposed between the anode and the cathode; a step of introducing water to the anode; and a step of applying voltage between the anode and the cathode, wherein at least the anode includes a porous metal body that has a three-dimensional mesh-like skeleton.

Regarding the hydrogen production apparatus that uses the SOEC method, the following note 3-1 is disclosed.

(Note 3-1)

A hydrogen production apparatus comprising:

an anode;

a cathode;

a solid oxide electrolyte membrane disposed between the anode and the cathode; and a power supply that applies voltage between the anode and the cathode, wherein at least one of the anode and the cathode includes a porous metal body that has a three-dimensional mesh-like skeleton.

Regarding the method for producing hydrogen by using the SOEC method, the following note 3-2 is disclosed.

(Note 3-2)

A method for producing hydrogen comprising:

a step of preparing an anode, a cathode, and a solid oxide electrolyte membrane disposed between the anode and the cathode;

a step of introducing steam to the anode or cathode; and a step of applying voltage between the anode and the cathode, wherein, of the anode and the cathode, at least the electrode to which the steam is introduced includes a porous metal body that has a three-dimensional mesh-like skeleton.

A porous metal body that has a three-dimensional mesh-like skeleton has a large surface area, high porosity, and excellent electrical conductivity. According to the hydrogen production apparatuses and the methods for producing hydrogen disclosed in the notes, the porous metal body is included in at least one of the anode and the cathode, and thus the water (steam) electrolysis efficiency is improved. In particular, in the PEM method and SOEC method, when, of the anode and the cathode, the electrode to which water or steam is introduced includes multiple porous metal bodies with different pore sizes, the water electrolysis efficiency is further improved. Here, the porous metal body having a smaller pore size is arranged on the polymer electrolyte membrane side or the solid oxide electrolyte membrane side.

The present invention will now be specifically described by using examples. These examples do not limit the present invention.

EXAMPLE 1

A fuel cell was prepared by the following procedure.

(1) Preparation of Precursor of First Porous Metal Body (First Precursor)

Product No. #8 of nickel CELMET (registered trademark) produced by Sumitomo Electric Industries, Ltd., was prepared as a precursor (first precursor A) of the first porous metal body.

(2) Preparation of Precursor of Second Porous Metal Body (Second Precursor)

Product No. #4 of nickel CELMET (registered trademark) produced by Sumitomo Electric Industries, Ltd., was prepared as a precursor (second precursor A) of the second porous metal body.

(3) Preparation of Composite Material

The first precursor A and the second precursor A were stacked and roll-pressed at a load of 1 MPa so as to prepare a composite material A in which the first porous metal body A and the second porous metal body A were bonded. In the first porous metal A, the pore size D1 was 450 µm, the porosity P1 was 95 vol %, the average cell size V1 was 500 µm, the density C1 was 60 openings/2.54 cm, and the thickness was 1.4 mm. In the second porous metal A, the pore size D2 was 900 µm, the porosity P2 was 95 vol %, the average cell size V2 was 1200 µm, the density C2 was 30 openings/2.54 cm, and the thickness was 2.0 mm.

(4) Preparation of MEA

A MEA was prepared by the following procedure.

First, BZY ($BaZr_{0.8}Y_{0.2}O_{2.9}$) was mixed with NiO so that 70 vol % of Ni (catalyst component) was contained, and the resulting mixture was disintegrated and kneaded in a ball mill. Then the obtained kneaded mixture was press-formed to form a formed body (thickness: 550 µm) constituting the anode, and the formed body was calcined at 1000° C. Subsequently, a paste obtained by mixing BZY ($BaZr_{0.8}Y_{0.2}O_{2.9}$) and a water-soluble binder resin (ethyl cellulose) was applied to one surface of the formed body by screen printing, and then the water-soluble binder resin was removed at 750° C. Next, co-sintering was performed in an oxygen atmosphere at 1400° C. so as to form the anode and the solid electrolyte layer (thickness: 10 µm).

Next, an LSCF paste obtained by mixing a cathode material, namely, powder of LSCF ($La_{0.6}Sr_{0.4}Co_{0.2}Fe_{0.8}O_{3-\delta}$), and ethyl cellulose was screen-printed on the surface of the solid electrolyte layer and fired in an oxygen atmosphere at 1000° C. for 2 hours to prepare a MEA. The thickness of the cathode was 10 µm.

(5) Preparation of Fuel Cell

The composite material A was placed on the surface of the anode of the MEA obtained as above so that the anode opposed the first porous metal body, and then an anode-side interconnector composed of stainless steel and having a smooth and flat surface was placed thereon. A cathode-side interconnector composed of stainless steel and having a gas channel was placed on the surface of the cathode so as to prepare a fuel cell A illustrated in FIG. 1. The anode-side interconnector and the cathode-side interconnector were respectively bonded to one ends of lead wires. The other ends of the lead wires were drawn out of the fuel cell and connected to a measuring instrument so that the current value and the voltage value between the lead wires could be measured.

(6) Power Generation Performance Evaluation

At an operation temperature of 600° C., the maximum output density when fuel gas (hydrogen) is supplied to the anode of the obtained fuel cell A at 0.3 L/min and air was supplied to the cathode at 1.0 L/min was determined. The results are indicated in Table 1.

(7) Pressure Loss Evaluation

The composite material A was loaded in a minute differential pressure sensor (0 to 2.0 KPa) so that the second porous metal body was disposed on the upstream side, the air pressure $P_0$ on the upstream side and the air pressure $P_1$ on the downstream side were measured, and the pressure loss ($=P_0-P_1$) was calculated. The results are indicated in Table 1.

COMPARATIVE EXAMPLE 1

A fuel cell B was prepared and evaluated as in Example 1 except that a nickel sintered body (pore size: 200 µm) was used instead of the composite material A. The results are indicated in Table 1.

TABLE 1

| Fuel cell | Maximum output density (mW/cm$^2$) | Pressure loss (Pa) |
|---|---|---|
| A | 421 | 200 |
| B | 305 | 500 |

It was found that the fuel cell B that used the nickel sintered body had a significantly large pressure loss and poor power generation performance. In contrast, the fuel cell A that used two porous metal bodies with different pore sizes had small pressure loss and excellent power generation performance.

REFERENCE SIGNS LIST

1: MEA, 1*a*: anode, 1*b*: solid electrolyte layer, 1*c*: cathode, 2*a*: first porous metal body, 2*b*: second porous metal body, 3*a*, 3*b*: interconnector, 4: gas channel, 10: fuel cell, 101: void, 102: fiber portion, 102*a*: hollow space, 103: opening, 20: hydrogen production apparatus, 21: structure, 21*a*, 21*c*: porous layer, 21*b*: solid oxide electrolyte membrane, 22A: anode, 22B: cathode, 22*a*, 22*b*: porous metal body, 23A, 23B: plate member, 24: gas channel

The invention claimed is:

1. A fuel cell comprising:
    a membrane electrode assembly (MEA) that includes a cathode, an anode, and a solid electrolyte layer disposed between the cathode and the anode, the solid electrolyte layer containing an ion-conducting solid oxide;
    at least one first porous metal body adjacent to at least one of the cathode and the anode and having a three-dimensional mesh-like skeleton;
    a second porous metal body stacked to be adjacent to the at least one first porous metal body and having a three-dimensional mesh-like skeleton; and
    an interconnector adjacent to the second porous metal body,
    wherein the at least one first porous metal body has a pore size smaller than a pore size of the second porous metal body,
    wherein the at least one first porous metal body and the second porous metal body are bonded,
    wherein, in a bonded portion of the at least one first porous metal body and the second porous metal body, the three-dimensional mesh-like skeleton of the at least one first porous metal body and the three-dimensional mesh-like skeleton of the second porous metal body are entangled, and wherein the entangled three-dimensional mesh-like skeletons of the at least one first porous metal body and the second porous metal body are a state in which a portion of an end of a fiber portion of the second porous metal body is inserted into an opening of a portion of an end of the at least one first porous metal body.

2. The fuel cell according to claim 1, wherein the at least one first porous metal body and the second porous metal body both have a porosity of 85 vol % or more.

3. The fuel cell according to claim 1, wherein the pore size of the at least one first porous metal body is 100 to 1000 μm.

4. The fuel cell according to claim 1, wherein the at least one first porous metal body is adjacent to at least the anode.

5. The fuel cell according to claim 1, wherein a ratio of the pore size of the at least one first porous metal body to the pore size of the second porous metal body is 0.05 to 0.8.

6. The fuel cell according to claim 1, wherein the second porous metal body has a specific surface area of 100 to 9000 $m^2/m^3$.

7. The fuel cell according to claim 1, wherein the second porous metal body has a thickness of 0.1 to 0.5 mm.

8. A fuel cell comprising:
a membrane electrode assembly (MEA) that includes a cathode, an anode, and a solid electrolyte layer disposed between the cathode and the anode, the solid electrolyte layer containing an ion-conducting solid oxide;
at least one first porous metal body adjacent to at least one of the cathode and the anode and having a three-dimensional mesh-like skeleton;
a second porous metal body stacked to be adjacent to the at least one first porous metal body and having a three-dimensional mesh-like skeleton; and
an interconnector adjacent to the second porous metal body,
wherein the at least one first porous metal body has a pore size smaller than a pore size of the second porous metal body,
wherein both the three-dimensional mesh-like skeleton of the at least one first porous metal body and the three-dimensional mesh-like skeleton of the second porous metal body have a sponge structure, and
wherein the three-dimensional mesh-like skeleton of the at least one first porous metal body having the sponge structure is bonded to the three-dimensional mesh-like skeleton of the second porous metal body having the sponge structure.

* * * * *